ATTORNEYS

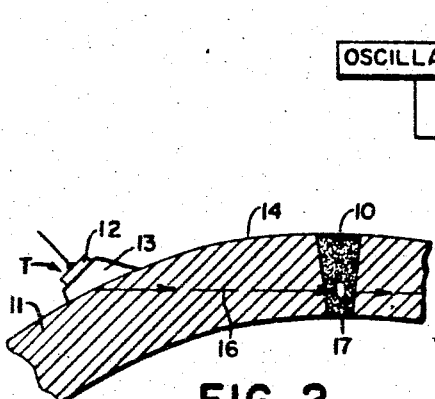
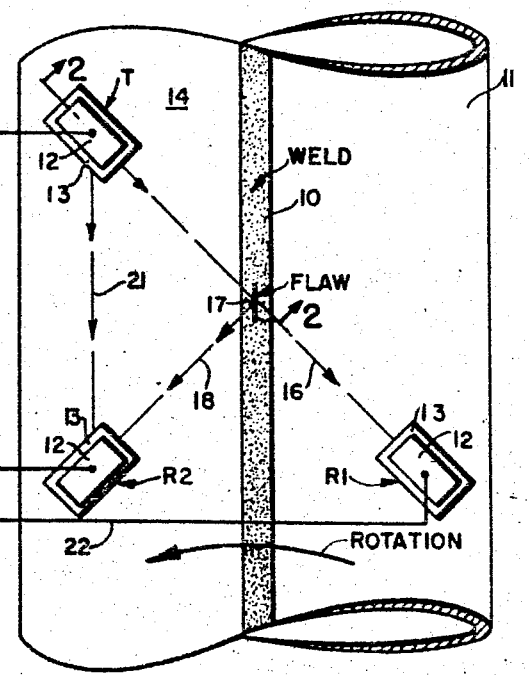
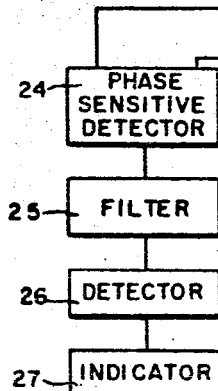
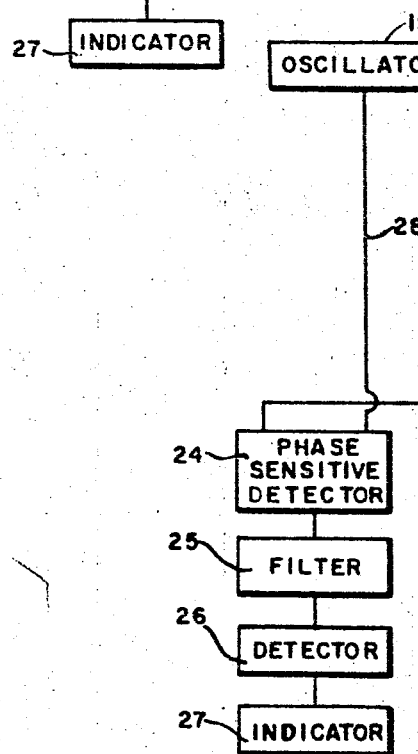
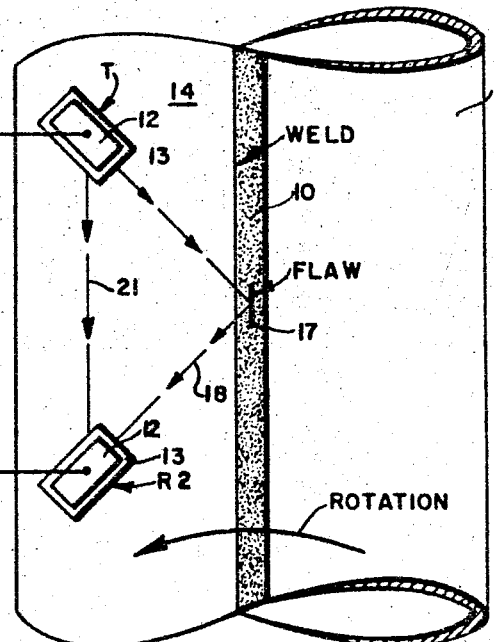
FIG. 1. FIG. 2. FIG. 3.
INVENTORS
Fenton M. Wood &
Noel B. Proctor INVENTORS
Fenton M. Wood &
Noel B. Proctor

United States Patent Office 3,321,959
Patented May 30, 1967

3,321,959
ULTRASONIC INSPECTION SYSTEM USING DOPPLER SHIFT
Fenton M. Wood, Sugarland, and Noel B. Proctor, Houston, Tex., assignors, by mesne assignments, to American Machine & Foundry Company, New York, N.Y., a corporation of New Jersey
Filed June 17, 1963, Ser. No. 288,319
21 Claims. (Cl. 73—67.7)

This invention relates to ultrasonic inspection systems, and more particularly to reflection systems for detecting a flaw or other anomaly in a region.

In the reflection-type ultrasonic inspection systems currently used, vibrational energy at an ultrasonic frequency is transmitted into a region; and a portion of the transmitted energy which is reflected from an anomaly in the region is detected and provides an indication of the existence of an anomaly.

A continual problem in such systems is the presence in the receiving channel of unwanted ultrasonic energy which has not been reflected from an anomaly. Since the amount of anomaly-reflected energy reaching the receiver is often quite small, a correspondingly small amount of unwanted energy will be sufficient to render the anomaly indication ambiguous or even to mask completely the anomaly return.

It is accordingly an object of this invention to provide an ultrasonic inspection system for discriminating between a reflected return from an anomaly and unwanted ultrasonic energy reaching the receiver.

This unwanted energy has two principal components, either or both of which may be present in any given inspection situation: (1) energy which has been reflected from an interface or discontinuity other than the anomaly which is the subject of the inspection; and (2) a portion of the transmitted energy which is fed directly from the ultrasonic transmitter to the receiver without reflection. Unwanted energy of the first type, i.e., energy reflected from an interface other than the sought anomaly, is present almost invariably, since in most practical inspection situations, the part or object to be inspected will have, in the vicinity of the inspected region, one or more surfaces which will reflect the ultrasonic energy transmitted. Directly transmitted energy will also normally appear in the receiving system, whether a single transducer is used as a transceiver, or whether the system uses separate transmitting and receiving transducers. In the former case, a certain amount of the energy to be transmitted will normally find its way from the transceiving transducer back into the receiving channel through the imperfection of any receiver-isolating device used. In the latter case, where separate transducers are used, a certan amount of stray transmitted energy will usually follow a direct path through the region from the transmitting transducer to the receiving transducer.

A common method of eliminating the effects of this unwanted energy in the receiving channel is to use a pulse-type system, gating the receiving channel on only for the relatively small amount of time during which reflected anomaly returns from the particular region of interest are expected. Thus, the receiver is turned off and is non-responsive during the time when the unwanted energy is incident upon the receiving transducer. This method, while effective, requires both the use of a pulse system, which is relatively complex in comparison with continuous wave transmission, and accurate gating, which requires expensive and complex timing circuits in addition to special control circuitry in the receiving channel.

It is therefore another object of this invention to provide an ultrasonic inspection system which discriminates between anomaly-reflected and unwanted energy and which does not require either the use of pulse-type transmission or of receiver gating.

It is a further object of this invention to provide such a system which will specifically discriminate between anomaly-reflected returns and unreflected transmitted energy appearing in the receiver channel.

It is a still further object of this invention to provide such a system which will specifically discriminate between anomaly-reflected energy and energy which is reflected from an interface or discontinuity other than an anomaly.

It is still another object of this invention to provide such a system which is relatively uncomplex and inexpensive to construct.

The objectives of this invention are accomplished, briefly, as follows: A reflection-type ultrasonic inspection system is provided having a transmitting and receiving means, which may include a single transceiving transducer, or separate transmitting and receiving transducers. Relative motion is established between the region being inspected and one or more of the transmitting and receiving means, so that the length of the path of anomaly-reflected energy is continuously changing. This continuously changing path length provides a Doppler shift in the frequency of the anomaly-reflected return at the receiving means. Frequency selective means are then used to discriminate between the Doppler-shifted anomaly return and the unwanted energy.

This method of discrimination is effective with respect to both of the principal components of unwanted energy discussed above. Energy directly fed from the transmitting means to the receiving means without reflection maintains the frequency of the transmitted energy, and may be differentiated, by frequency selection, from Doppler-shifted anomaly returns. Discrimination between the Doppler-shifted anomaly returns and reflected returns from other interfaces or discontinuities may be effected providing that the relative motion established results in a rate of change of path length for an anomaly return which is different from the rate of change of path length, if any, for an interface return. As long as these two rates of change are substantially different, the Doppler shift of the anomaly return frequency will be different than the Doppler shift, if any, of the interface return, and the two returns will arrive at the receiving means with differing frequencies which may be differentiated by frequency selective means. Since most objects or parts to be inspected will have a continuous and relatively smooth interface or surface, it is normally no problem to establish the appropriate relative motion such that the path length for reflections from the interface or surface either does not change at all, or changes at a rate substantially different from the rate of change of the path length for reflections from an anomaly.

While several specific embodiments of this invention are described in detail below, it is to be understood that they comprise only illustrations of specific systems which may be constructed in accordance with the principles of this invention, and that they are not intended in any way to serve to define or limit the scope of invention, which functions are of course performed solely by the appended claims. The manner in which this invention fulfills the above and other objects may be understood more clearly by reference to the following detailed description of several specific embodiments taken in conjunction with the drawings, which form a part of the specification, and in which:

FIG. 1 illustrates, partially in plan view and partially in block diagram, one embodiment of this invention in an ultrasonic inspection system for locating flaws in metal pipe welds, and in which the frequency selective means comprises phase comparison means;

FIG. 2 is a partial section taken along line 2—2 of FIG. 1;

FIG. 3 shows, partially in plan view and partially in block diagram, another embodiment of this invention quite similar to that of FIG. 1, but which uses one less transducer and a slightly different phase comparison arrangement;

Figure 5:
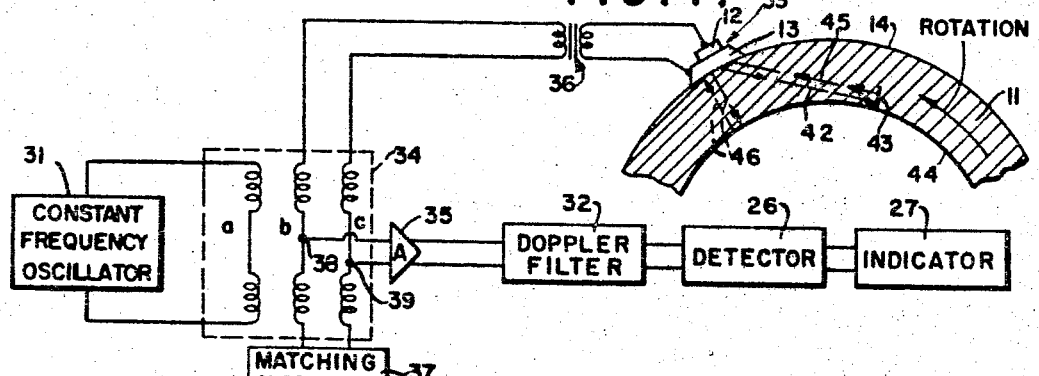
Figure 6:
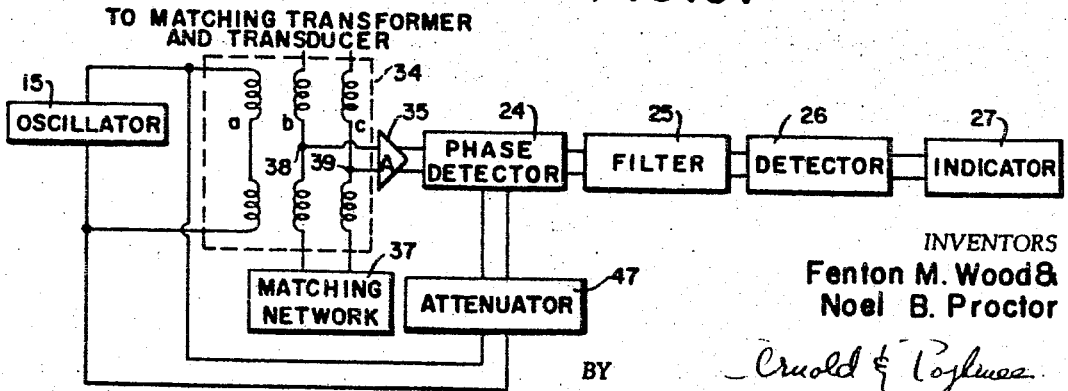

FIG. 5 shows, partially in section and partially in block diagram, yet another embodiment of this invention in an ultrasonic inspection system for detecting flaws in a pipe, and which uses a single transceiving transducer and Doppler filter means for frequency selection; and FIG. 6 shows, in block diagram, a phase comparison type of frequency selection means which is usable with the single transceiver of the FIG. 5 embodiment in lieu of the frequency selective means shown in that embodiment, and which comprises a further embodiment of this invention.

FIGS. 1 and 2 illustrate one embodiment of this invention in a system for discovering flaws in a longitudinal weld 10 in a metal pipe 11. This system utilizes a transmitting transducer T and two receiving transducers R1 and R2. Each of the three transducers comprises a transducing element 12, which may conveniently be a quartz piezoelectric crystal, and a wedge 13 for angular coupling of ultrasonic energy between transducing element 12 and the outer cylindrical surfaces 14 of pipe 11. The use of such wedges in connection with transducing elements for coupling ultrasonic energy into and out of a surface at angles other than normal to the surface is well known, and is discussed, for instance in U.S. Patent 2,527,986 to Benson Carlin. Wedges 13 may be of any material suitable for coupling ultrasonic energy between the particular transducing elements used and the particular metal of which pipe 11 is constructed.

Continuous wave electrical signals at an ultrasonic frequency are generated by oscillator 15 and applied to transducing element 12 of transmitting transducer T. The transducing element transforms the electrical signals into compressional waves at the same frequency and transmits them via coupling wedge 13 and surface 14 into pipe 11.

The transmitted ultrasonic energy is refracted by passage through surface 14 and the resulting beam which is transmitted through pipe 11 may be of either the longitudinal or shear modes. It is transmitted in a beam, whose center line is shown as dashed line 16, along a chordal path from transmitting transducer T through the thickness of the pipe to receiving transducer R1. With pipe 11 and weld 10 in the position shown in FIGS. 1 and 2, a flaw 17 appearing in weld 10 causes a portion of the transmitted energy to be reflected toward receiving transducer R2, in a beam having a center line represented by dashed line 18.

While most of the energy transmitted from transducer T is contained in a reasonably well defined beam, a portion of the energy from transducer T is unavoidably scattered in various directions throughout pipe 11, and some of the energy so scattered follows a direct line path, shown as dashed line 21, from transducer T to receiving transducer R2. Since the portion of transmitted energy which is reflected by a flaw 17 and ultimately reaches receiving transducer R2 is quite small, even a slight amount of stray energy reaching transducer R2 along direct path 21 will make the detection of a flaw difficult. The invention provides means for discriminating between energies following these two paths and incident upon receiving transducer R2.

Pipe 11 is continuously rotated about its axis, by means not shown, in the direction indicated by the arrow in FIG. 1, i.e., it rotates in such a direction that longitudinal weld 10 tends to move toward transducers T and R2 as it passes through the beam of transmitted ultrasonic energy. As flaw 17 moves continuously through the beam, the path of flaw-reflected energy continuously decreases in length, i.e., the path length from transducer T to flaw 17 and thence to receiving transducer R2 becomes continuously shorter. This continuous shortening of the path length creates a Doppler shift in the flaw-reflected return, so that flaw-reflected energy reaches transducer R2 with a frequency higher than that of the transmitted energy. This frequency difference provides the basis for discrimination between flaw-reflected and direct energy received at receiving transducer R2.

The phase of two signals at different frequencies varies continuously, and the frequency selective means used in this embodiment to distinguish between directly transmitted and flaw-reflected energy makes use of this varying phase relationship between the two signals. The compressional wave energy incident upon receiving transducers R1 and R2 is converted by transducing elements 12 into representative electrical signals, and these signals are connected from transducers R1 and R2, via wires 22 and 23, respectively, to the two inputs of a phase sensitive detector 24.

The structure of detector 24 is conventional, and forms no part of this invention. It may be any of the commonly used type of phase sensitive circuits which receives electrical signals at its two inputs and provides an output signal which is representative of the phase relationship between the input signals. Thus, if the two input signals are in phase, there is no output; if the two input signals maintain a constant phase difference, the detector output is a consant, or D.C., signal; and if the input signals exhibit a varying relationship, the output signal will be alternating in nature (A.C.).

Since the vibrational wave energy incident upon receiving transducer R2, and therefore its electrical output signal, comprises two principal components, each of these components, when its phase is compared with the phase of directly transmitted compressional wave energy received at transducer R1 along path 16, will produce a distinctive component in the output signal of detector 24. Compressional wave energy transmitted directly from transmitting transducer T along path 21 to receiving transducer R2 bears a constant phase relationship with the compressional wave energy received at receiving transducer R1, and will produce a constant, or D.C. component at the output of detector 24. Flaw-reflected energy, on the other hand, having a phase which continuously varies with respect to the phase of directly transmitted, non-reflected energy, produces a varying, or alternating, component at the output of detector 24.

The output of detector 24, containing both A.C. and D.C. components, is fed to filter 25, which passes the A.C. component but rejects the D.C. component. Filter 25 may be any type of conventional high-pass filter which will reject D.C. and pass A.C. Since the Doppler shift in the flaw-reflected echo is a function of the rate of change of path length, i.e., it is a function of the transducer configuration and the speed of rotation of the pipe, the low frequency cut-off point of filter 25 is designed to permit the filter to pass the frequencies which will be encountered, as determined by these parameters, in any given testing situation. The A.C. component of the signal, which has passed through filter 25, and which indicates the existence of a flaw in weld 10, is fed through a conventional detector 26 wherein the A.C. is converted to a D.C. signal, and thence to a conventional indicator 27 where the D.C. signal is used to provide an indication of the existence of a flaw in any desired manner. The indicator may be of any type, providing a visual, audible or other type of flaw-indicating signal. Detector 26 is necessary only if the particular indicator used requires detection of the A.C. signal, an indicator operating directly from A.C. would of course require no detector. The presence of an alternating current output from filter 25 indicates the existence of a flaw, and any convenient type of utilization circuitry may be employed at the output of the filter.

The system of FIGS. 1 and 2 does not depend upon maintaining a constant frequency output from oscillator 15. This follows from the use of phase comparison as the frequency selective means. Whatever the variations in the frequency of the transmitted energy, flaw-reflected energy will be frequency shifted therefrom, and will exhibit a continuously varying phase relationship therewith. Extremely rapid variations in oscillator frequency might cause some trouble in system operation if the frequency should shift rapidly enough to produce a varying phase relationship between directly transmitted energy reaching receiving transducers R1 and R2. That is, if the frequency should change sufficiently in the time differential between the direct paths from transmitting transducer T to receiving transducers R1 and R2, a comparison of the directly transmitted energy incident upon them in detector 24 would not produce a D.C. output, since there would be a continuous variation in phase. However, the time differential in the path lengths is extremely slight, and there is little danger of frequency shifting sufficiently in that time to present any problem. Further, if the pipe rotates rapidly enough so that the Doppler shift is relatively high, the low frequency cut-off point of filter 25 may be set high enough to reject any very low frequency variations which might result thereby. A low frequency cut-off point slightly above D.C. would also reject any low frequency A.C. components in the detector output resulting from slow physical variations in the distances between the transducers as the pipe is rotated. In order for there to be no such A.C. component due to variations in the distances between transducers, the difference between the distances from T to R1 and from T to R2 must remain constant.

It should be noted further with respect to this system that there is no requirement that the pipe rotate at a constant angular rate. Any continuous rotation produces a changing flaw echo path length and a resulting Doppler shift in the flaw echo frequency. However, the more nearly constant the speed of rotation of pipe 11, the more nearly constant will be the alternating current component of the detector output. A constant speed angular rotation, resulting in a constant rate of change of echo path, gives a constant frequency difference between directly transmitted and flaw-reflected energy incident upon the transducers. This results in a constant frequency A.C. output component of detector 24. The more nearly constant the speed of rotation, therefore, the narrower the band of frequencies which filter 25 must pass. The filter, therefore, may conveniently be a band pass filter in such circumstances, enabling the system to reject a considerable amount of noise at unwanted frequencies.

FIG. 3 shows an embodiment which is quite similar to the embodiment shown in FIGS. 1 and 2, and identical components in the two configurations are identically marked in the figures. The FIG. 3 embodiment differs from that of FIG. 2 structurally in that receiving transducer R1 is not used, and the reference signal for comparison with the output signal of receiving transducer R2 in detector 24 is obtained by a direct connection via line 28 from oscillator 15 to one input of detector 24. The operation of this system, including phase sensitive detector 24, filter 25, detector 26, and indicator 27 is otherwise identical to that of the system of FIGS. 1 and 2.

In the FIG. 3 configuration, energy directly transmitted along line 21, in order to provide the appropriate D.C. output from detector 24, must maintain, at its point of incidence upon receiving transducer R2, a constant phase relationship with the output of continuous wave oscillator 15. This requires that the distance between transmitting transducer T and receiving transducer R2 be maintained constant. As in the configuration of FIGS. 1 and 2, however, if the Doppler shift in the flaw-reflected energy is sufficiently high, the low frequency cut-off point of filter 25 may be set high enough to reject low frequency A.C. outputs from detector 24 resulting from fairly slow variations in the distance between the two transducers. Note that in the FIG. 1 configuration, it was not the distance between transmitting transducer T and receiving transducer R2 which was critical, but rather the relationship between the two paths from the transmitting transducer to the two receiving transducers.

If, in the FIG. 3 embodiment, both the frequency of the transmitted energy and the angular velocity of pipe 11 were maintained constant, then the anomaly or flaw reflection incident upon receiving transducer R2 would have a constant frequency different from the constant frequency of the transmitted energy. In such a case, there would, of course, be no necessity for the phase comparison system and the output of transducer R2 could be fed directly through a filter adapted to pass only the constant, Doppler-shifted, flaw return frequency. Such a system is shown in FIG. 4.

Figure 4:
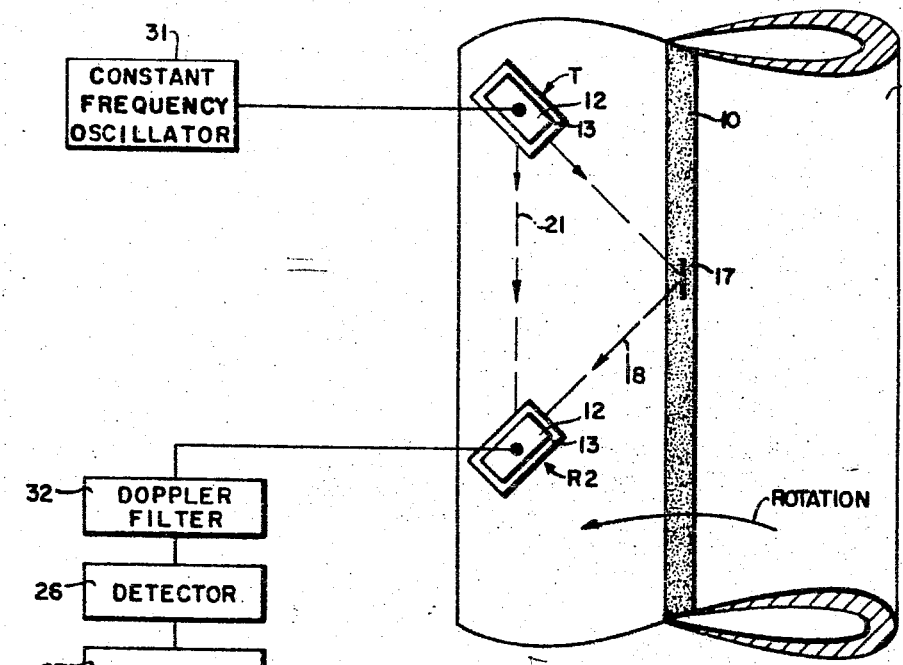
FIG. 4 shows, partially in plan view and partially in block diagram, still another embodiment of this invention in an ultrasonic inspection system for pipe welds in which the transducer arrangement is similar to that of the embodiment shown in FIG. 3, but in which the frequency selection is accomplished by Doppler filter means.

In the FIG. 4 embodiment, transducers T and R2 and their arrangement upon pipe 11 are identical to those of the FIG. 3 embodiment. In the FIG. 4 system, however, a constant frequency oscillator 31 feeds transmitting transducer T, so that the vibrational wave energy transmitted into pipe 11 also has a constant frequency. Pipe 11 is rotated in the same direction as in the previously described embodiments, but it is rotated here with a constant angular velocity. This results in a constant rate of change for the flaw-reflected path length, causing the flaw return frequency, at receiving transducer R2, to be shifted a constant amount from the transmitted frequency. Since transmitted frequency is constant, the flaw echo frequency will therefore also be constant.

Receiving transducer R2 also receives stray transmitted energy which is directly transmitted from transducer T along path 21. This energy, of course, arrives at R2 unmodified by the rotation of the pipe, and therefore has the same frequency as the transmitted energy. Transducing element 12 of receiving transducer R2 transforms the incident vibrational energy into a representative electrical signal whose two component frequencies are the frequency of transmission and the Doppler-shifted return frequency.

This electrical signal is fed to Doppler filter 32. A Doppler filter is a band pass filter having a very narrow pass band, and is often known as a "notch" filter. Such filters are conventional and the construction of Doppler filter 32 forms no part of this invention. The narrow pass band of filter 32 is adapted to pass the Doppler-shifted return frequency and reject the frequency of transmission. The filtering characteristics of Doppler filter 32 must be much more precise than those of filter 25 used in the two embodiments previously discussed. In those previous embodiments, filter 25 was required only to distinguish between a direct current and a relatively low frequency alternating current, a relatively simple filtering problem. Doppler filter 32, however, is required to selectively distinguish between an ultrasonic frequency of transmission and a Doppler-shifted frequency which is relatively close to the transmitted frequency, i.e., the ratio of the Doppler-shift to the frequency of transmission is very small. Doppler filter 32, therefore, must have very sharp frequency selection characteristics. It should be noted that, strictly speaking, it is not necessary that filter 32 be a band pass filter. Since we are concerned primarily with two frequencies, a transmitted frequency, and a somewhat higher (for the direction of pipe rotation shown) frequency, filter 32 could theoretically be a high pass filter which would pass all frequencies above the transmitted frequency. In practice, however, a band pass type filter is used so that any noise arriving at frequencies above the Doppler-shifted return frequency would also be rejected by the filter and kept out of the subsequent receiving channel stages.

Any output of Doppler filter 32, indicative of the existence of a flaw 17 in weld 10, is then fed to detector 26 for conversion into a D.C. signal and subsequently to indicator 27. Detector 26 and indicator 27 are identical in function to those shown and described in the two previous configurations, and the remarks made concerning them in the previous description are applicable to this embodiment also.

The embodiments of FIGS. 1–4 have been described from the standpoint of distinguishing the reflected flaw or anomaly return from unreflected energy directly transmitted through the pipe. As described in the introductory remarks, energy reflected from an interface or surface other than the anomaly often forms a part of the unwanted energy incident upon the receiving means. In the embodiments of FIGS. 1–4 a certain amount of stray energy from transmitting transducer T is reflected from the inner or outer pipe surfaces and eventually finds its way to receiving transducer R2. Since, however, each reflection from a pipe surface results in considerable attenuation, these unwanted reflections which reach R2 are considerably weaker than the stray energy which is directly transmitted. Since rotation of pipe 11 does not alter the length of these reflected paths, this energy will also be discriminated against, as is the directly transmitted energy, by the frequency selective means employed.

FIGS. 5 and 6 show somewhat different embodiments of this invention in which a single transceiving transducer is used for both transmission and reception of the vibrational wave energy. Transceiving transducer 33, which is identical structurally to the transducers used in previously described embodiments, is interconnected through a hybrid bridge network, including a three-winding hybrid transformer 34, with constant frequency continuous wave oscillator 31 and a receiving channel comprising amplifier 35, Doppler filter 32, detector 26, and indicator 27. The hybrid bridge is a circuit having directional impedance characteristics, and its purpose is to prevent energy from oscillator 31 from being fed directly into the receiving channel. Hybrid bridge circuits utilizing three-winding hybrid coils are commonly used in two-way amplifiers in telephone repeaters and details of their structure and operation are described in the literature, as for instance in "Transmission Lines and Networks" by Walter C. Johnson, McGraw-Hill, 1950, at pages 213–216. Hybrid coil 34 has three windings, a primary coil a, and two identical secondaries, b and c. The output of constant frequency oscillator 31 is connected across primary coil a. The primary winding of impedance matching transformer 36 is connected between one end of each of hybrid coil secondaries b and c, and the secondary of transformer 36 is connected to transceiving transducer 33. An impedance matching network 37 is connected across the other ends of hybrid coil secondaries b and c. The input to amplifier 35, the first stage in the receiver channel, is connected between centertaps 38 and 39 of secondaries b and c, respectively, comprising one diagonal of the bridge circuit. Transducer 33 and its associated impedance matching transformer 36 thus form an arm of the bridge circuit, as does impedance matching network 37.

Electrical oscillations at a constant ultrasonic frequency from oscillator 31 are coupled from primary a into secondaries b and c in the manner characteristic of such a network, with half of the coupled energy being fed into transducer 33 and the other half of the energy being fed into matching network 37. There is substantially no potential difference existing between centertaps 38 and 39, and, therefore, substantially none of the energy from oscillator 31 will be fed into amplifier 35. Received energy, fed back into hybrid coil 34 from transducer 33, will create a potential difference across centertaps 38 and 39 and this received energy will therefore be coupled into amplifier 35. It is necessary for proper operation of the balanced bridge circuit that matching network 37 offers an impedance which precisely matches the impedance in the other arm of the bridge presented by transducer 33 and matching transformer 36.

The constant frequency, continuous wave electrical energy from oscillator 31 is transformed by transducing element 12 into corresponding vibrational wave energy, which is coupled via wedge 13 and pipe outer surface 14 into the interior of the pipe. The energy, as refracted by outer surface 14, may be either the shear or longitudinal modes, and is largely contained in a beam whose center line is shown as dashed line 42. Pipe 11 is rotated, by means not shown, at a constant angular velocity and in such a direction that a flaw, such as flaw 43 in inner surface 44 of pipe 11, moves through the energy beam toward transducer 33. A portion of the transmitted energy is reflected by flaw 43 back to transducer 33 along a path indicated by dashed line 45. Since flaw 43 is moving with a constant angular velocity, the path length for the flaw-reflected echo is decreasing at a constant rate, and the reflected energy reaches transducer 33 Doppler-shifted upward in frequency a constant amount from the constant frequency of transmission. This flaw echo is fed back into the hybrid coil, and through centertaps 38 and 39 to the input of the receiving channel.

There will, however, be electrical signals of unwanted nature which are also fed into the receiving channel. Not all of the reflected energy received at transducer 33 is flaw-reflected energy. There will be a stray portion of transmitted energy which is reflected from inner pipe surface 44, as indicated by the dotted line path 46. Since the two pipe surfaces are coaxial cylinders, the length of path for energy reflected from inner pipe surface 44 will remain constant with rotation of pipe 11, and therefore such reflected energy will return to transducer 33 with its frequency unmodified, i.e., it will maintain the transmitted frequency. Another source of unwanted electrical energy in the receiver channel is the energy directly fed through from oscillator 31 into the receiving channel input, due to imperfections in the balanced bridge circuit. This balanced bridge provides only theoretically perfect isolation; practical bridges will permit a portion, albeit small, of the oscillator energy to be fed directly into the input of amplifier 35.

Amplifier 35 is of any convention design and it will amplify the unwanted signals as well as the flaw-reflected signal. Since the signal at the output of amplifier 35 comprises flaw echo energy having a constant, Doppler-shifted frequency and unwanted energy which is all at the constant frequency of transmission, a Doppler filter 32, identical to that used in the embodiment of FIG. 4, is used to select and pass only the flaw echo portion of the signal. Detector 26 and indicator 27 function as in the previous described embodiments.

While the use of a three-winding hybrid coil 34, having two secondaries, b and c, results in a balanced circuit, and accounts for the use of two leads throughout the receiving channel, only one secondary winding is necessary for operation of the device. For instance, coil c might be replaced by a straight wire and point 39 grounded, with one input of all the receiving channel components also being connected to ground.

FIG. 6 shows another embodiment of this invention using a single transceiving transducer. Transducer 33, the matching transformer 36, and details of the connection of the transducer to pipe 11 are identical to those shown in FIG. 5 and are omitted from FIG. 6. In the embodiment of FIG. 6, the frequency selective means employed is phase comparison, in a manner similar to the phase comparison system of the embodiment shown in FIG. 3. The frequency of transmission need not be maintained constant, and therefore the oscillator used in this embodiment may be the same oscillator 15 utilized in the embodiments of FIGS. 1, 2 and 3. Also, as is evident from the description of the embodiment of FIG. 3, pipe 11 need not be rotated at a constant angular velocity, it is sufficient that there be continuous rotation. Continuous wave ultrasonic energy is fed from oscillator 15 through the bridge circuit and into transceiving transducer 33 in a manner identical to that shown in FIG. 5, and transmitted energy reflected from a flaw 43 is fed back through the bridge into the input of amplifier 37 in an identical manner.

Unwanted energy at the output of amplifier 35, both energy directly coupled from oscillator 15 because of the imperfection of the hybrid bridge, and energy reflected from pipe inner surface 44, is at the frequency of oscillator 15. The flaw echo component of the amplifier output, on the other hand, is at some Doppler-shifted frequency different from that of oscillator 15.

The output of amplifier 35 is fed to one of the inputs of phase detector 24. The output of oscillator 15 is fed through a conventional attenuator 47 to the other input of phase detector 24, thus coupling a sample of the oscillator output to the phase detector for use as a phase reference. Phase detector 24 operates in a manner analogous to its operation in the embodiment of FIG. 3, providing a D.C. output for that component of its input from amplifier 35 which is at the frequency of oscillator 15, and providing an A.C. output for flaw echo energy received from amplifier 35. Filter 25, detector 26 and indicator 27 are identical in structure and function to those used in the configuration of FIG. 3.

It should be noted that while oscillator 15 in the embodiment of FIG. 6 is not required to maintain a constant frequency, its frequency must not change so rapidly that it would have shifted by a significant amount during the time required for the surface-reflected energy to traverse path 46. If this were the case, then this particular component of the unwanted energy would no longer have a constant phase relationship with the reference frequency coupled directly from oscillator 15 to phase detector 24, and consequently would result in an A.C. rather than a D.C. signal at the output of the phase detector.

While specific embodiments of this invention have been described herein, such alterations and modifications as will suggest themselves to those skilled in the art are also included within this invention, whose scope is defined solely in the appended claims.

What is claimed is:

1. Ultrasonic inspection apparatus for detectng an anomaly in a region, comprising in combination:
   transmitting means for transmitting ultrasonic energy into said region at an angle of incidence thereto;
   receiving means responsive to ultrasonic energy reflected from an anomaly in said region and also unavoidably responsive to unwanted ultrasonic energy not reflected from an anomaly but of substantially the same frequency as some of said transmitted ultrasonic energy,
      said receiving means being located at an angle of reflection with respect to said region and substantially out of the path of said ultrasonic energy transmitted to said receiving means;
   means for establishing relative motion between said region and at least one of said transmitting and receiving means,
      so that the path length for energy reflected from an anomaly changes continuously at a rate different from the rate of any change occurring in the path length for said unwanted energy not reflected from an anomaly,
      whereby the frequency, at said receiving means, of energy reflected from an anomaly differs from the frequency, at said receiving means, of said unwanted energy not reflected from an anomaly; and
   phase comparison means for comparing the phases of the energy at said receiving means and of energy bearing a constant phase relationship with said transmitted energy and providing an output signal representative of their phase difference,
      whereby that portion of said received energy which is reflected from an anomaly produces an alternating output signal, and that portion of said received energy comprising said unwanted energy produces a substantially constant output signal, and means connected to said phase comparison means responsive to said alternating output signal and not responsive to said substantially constant output signal.

2. The ultrasonic inspection apparatus described in claim 1, wherein said means for establishing motion between said region and at least one of said transmitting and receiving means changes said path length for energy reflected from an anomaly at a constant rate,
   wherein said alternating output signal is of a substantially constant frequency, and
   wherein said ultrasonic inspection apparatus further comprises a band pass filter means for receiving said alternating output signal and for responding only to said substantially constant frequency.

3. The ultrasonic inspection apparatus described in claim 1, wherein the frequency of said transmitted energy is substantially constant,
   wherein the frequency of said energy reflected from said anomaly is substantially constant at said receiving means, and
   wherein said ultrasonic inspection apparatus further comprises a band pass filter means responsive to said substantially constant frequency of said energy reflected by said anomaly.

4. Ultrasonic inspection apparatus for detecting an anomaly in a region bounded by at least one interface, comprising in combination
   transmitting means for transmitting ultrasonic energy into said region;
   receiving means responsive to ultrasonic energy reflected from said anomaly and said interface, said energy reflected from said interface having substantially the same frequency as said transmitted energy and said energy reflected from said anomaly having a substantially different frequency;
   means for establishing relative motion between said region and at least one of said transmitting and receiving means to change the path lengths of said energy reflected from said anomaly and said interface at different rates respectively,
      whereby the frequency of ultrasonic energy reflected from said anomaly differs at said receiving means from the frequency of said ultrasonic energy reflected from said interface;
   phase comparison means for comparing the phases of the reflected energy at said receiving means and energy having a constant phase relationship to said transmitted energy and providing an output signal representative of any difference therebetween,
      whereby that portion of said energy at said receiving means which is reflected by said anomaly produces an alternating output signal and that portion of said energy at said receiving means which is reflected by said interface produces a substantially constant output signal; and
   means connected to said phase comparison means responsive to said alternating output signal produced by said anomaly-reflected energy and not responsive to said substantially constant output signal produced by said interface-reflected energy.

5. Ultrasonic inspection apparatus for detecting an anomaly in a region bounded by at least one interface, comprising in combination
   transmitting means for transmitting ultrasonic energy into said region;
   receiving means responsive to ultrasonic energy reflected from said anomaly and responsive to ultrasonic energy reflected from said interface;

means for establishing relative motion between said region and at least one of said transmitting and receiving means so that the path length for energy reflected from said interface remains constant and so that the path length for energy reflected from said anomaly changes at a substantially constant rate, whereby the frequency of ultrasonic energy reflected from said anomaly differs at said receiving means from the frequency of said ultrasonic energy reflected from said interface, and whereby the frequency of said transmitted ultrasonic energy is substantially the same as the frequency of said energy reflected from said interface and different to a substantially constant degree from the frequency of said energy reflected from said anomaly; and phase comparison means for comparing the phases of the energy at said receiving means and energy having a constant phase relationship to said transmitted energy and providing an output signal representative of any phase difference therebetween, whereby that portion of the energy at said receiving means which is reflected from an anomaly produces an alternating output signal of substantially constant frequency and that portion of the energy at said receiving means which is reflected from said interface produces an output signal which is substantially constant; and means connected to said phase comparison means responsive to said alternating output signal and not responsive to said substantially constant output signal.

6. The utrasonic inspection apparatus described in claim 5, wherein said means connected to said phase comparison means comprises a band pass filter having a band centered at the frequency of said alternating output signal.

7. Ultrasonic inspection apparatus for detecting an anomaly in a region bounded by at least one interface, comprising in combination:

transmitting means for transmitting ultrasonic energy into said region;

receiving means responsive to ultrasonic energy reflected from an anomaly and unavoidably also responsive to ultrasonic energy reflected from said interface;

means for establishing relative motion between said region and at least one of said transmitting and receiving means so that the path length for energy reflected from said interface remains constant and so that the path length for energy reflected from said anomaly changes at a substantially constant rate, whereby the frequency of ultrasonic energy reflected from said anomaly differs at said receiving means to a substantially constant degree from the frequency of said transmitted energy and differs at said receiving means from the frequency of said ultrasonic energy reflected from said interface;

phase comparison means for comparing the phases of the energy at said receiving means and energy bearing a constant phase relationship to said transmitted energy and providing an output signal representative of their phase difference, whereby that portion of the energy at said receiving means which is reflected from an anomaly produces an alternating output signal of substantially constant frequency; and means connected to said phase comparison means responsive only to an output signal of the substantially constant frequency resulting from anomaly-reflected energy.

8. The ultrasonic inspection apparatus described in claim 7 wherein said means connected to said phase comparison means comprises a band pass filter having a pass band centered at the frequency of said alternating output signal.

9. Ultrasonic inspection apparatus for detecting an anomaly in a region comprising:

transmitting transducer means for transmitting ultrasonic energy into said region;

ultra energy generating means for supplying ultrasonic energy to said transmitting transducer means;

receiving transducer means spaced from said transmitting transducer means and responsive to a portion of said energy which is reflected from an anomaly in said region, said receiving transducer means being unavoidably also responsive to unwanted ultrasonic energy having substantially the same frequency as said transmitted energy and which is not reflected from an anomaly;

means for establishing relative motion between said region and at least one of said transmitting and receiving transducer means, so that the path length for energy reflected from an anomaly changes continuously at a rate different from the rate of any change occurring in the path length for said unwanted energy not reflected from an anomaly, whereby the frequency, at said receiving transducer means, of energy reflected from an anomaly differs from the frequency, at said receiving transducer means, of said unwanted energy not reflected from an anomaly;

phase comparison means for comparing the phases of the energy at said receiving means and energy bearing a constant phase relationship to said transmitted energy and providing an output signal representative of their phase difference, whereby that portion of said energy at said receiving transducer means which is reflected from an anomaly produces an alternating output signal, and that portion of said energy at said receiving transducer means comprising said unwanted energy which is not reflected from an anomaly produces a substantially constant output signal; and means connected to said phase comparison means responsive to said alternating output signal and not responsive to said substantially constant output signal.

10. The ultrasonic inspection apparatus described in claim 9 wherein said relative motion between said region and said at least one of said transmitting and receiving transducer means is such that the rate of change of the path length for anomaly-reflected energy is substantially constant, whereby the difference between the frequency of said transmitted energy and the frequency, at said receiving transducer means, of anomaly-reflected energy is substantially constant, and whereby that portion of the energy received at said receiving transducer means which is reflected from an anomaly produces a substantially constant frequency output signal from said phase comparison means; and wherein said means connected to said phase comparison means comprises band pass filter means for passing only said substantially constant frequency alternating output signal resulting from anomaly-reflected energy.

11. Ultrasonic inspection apparatus for detecting an anomaly in a region, comprising transmitting transducer means for transmitting ultrasonic energy into said region;

first receiving transducer responsive to unreflected transmitted energy;

second receiving transducer responsive to transmitted energy reflected by an anomaly and to unreflected transmitted energy;

said first and second receiving transducers being disposed relative to said transmitting transducer so that unreflected transmitted energy incident on said first receiving transducer bears a substantially constant phase relationship to unreflected transmitted energy incident on said second receiving transducer;

means for establishing relative motion between said region and at least one of said transducers
so that the path length for energy reflected from an anomaly changes continuously at a rate different from the rate of any change occurring in the path length for said unwanted energy not reflected from an anomaly,
whereby the frequency of energy reflected from an anomaly at said second receiving transducer differs from the frequency of said unwanted energy not reflected from an anomaly; and phase comparison means having two inputs and an output and adapted to compare the phases of signals at said inputs and provide an output signal representative of their phase difference;
one of said inputs being connected to said first receiving transducer and the other of said inputs being connected to said second receiving transducer,
whereby that portion of the energy incident upon said second receiving transducer which is reflected from an anomaly produces an alternating output signal and that portion of the energy incident upon said second receiving transducer which is unreflected produces a substantially constant output signal; and means connected to said output of said phase comparison means responsive to said alternating output signal and not responsive to said substantially constant output signal.

12. Ultrasonic inspection apparatus for detecting an anomaly in an object bounded by at least one cylindrical surface, comprising in combination:

transmitting transducer means for transmitting ultrasonic energy into said object along a relatively narrow path;

receiving transducer means
spaced from said transmitting transducer means displaced from said path from said transducer means and said object,
responsive to ultrasonic energy reflected from an anomaly in said object, and
also unavoidably responsive to at least one of (a) energy directly transmitted from said transmitting transducer and (b) energy reflected from said surface of said object;

means for rotating said object about the axis of said cylindrical surface, with said transmitting transducer means and said receiving transducer means remaining fixed with respect to each other and to said axis of said cylindrical surface,
whereby the path length for energy reflected from an anomaly changes continuously and the frequency of such energy, at said receiving transducer means, differs from the frequency of said transmitted energy, and
whereby the path length for energy reflected from said surface of said object remains substantially constant and the frequency of such energy, at said receiving transducer means, is substantially the frequency of said transmitted energy;

phase comparison means for comparing the phases of the energy at said receiving means and energy bearing a constant phase relationship to said transmitted energy and providing an output signal representative of their phase difference,
whereby that portion of said energy which is reflected from an anomaly produces an alternating output signal, and that portion of said received energy which is not reflected from an anomaly produces a substantially constant output signal; and filter means connected to said phase comparison means for passing said alternating output signal and rejecting said substantially constant output signal.

13. The ultrasonic inspection apparatus described in claim 12, wherein
said object is rotated with a substantially constant angular velocity,
so that the path length for anomaly-reflected energy changes at a substantially constant rate,
whereby the difference, at said receiving transducer means, between the frequency of said transmitted energy and the frequency of anomaly-reflected energy is substantially constant and whereby said anomaly-reflected energy produces an alternating output signal of substantially constant frequency; and said filter means comprises band pass filter means adapted to pass only said substantially constant frequency output signal.

14. Ultrasonic inspection apparatus for detecting an anomaly in a region comprising:

a transducer adapted to transmit continuous wave ultrasonic energy into said region and responsive to a portion of said ultrasonic energy which is reflected from an anomaly,
said transducer also unavoidably responsive to unwanted ultrasonic energy which is not reflected from an anomaly;

ultrasonic energy generating means for supplying continuous wave ultrasonic energy to said transducer for transmission into said region;

receiving circuit means;

directional impedance means operatively connected to said transducer, said generating means and said receiving circuit means
to block direct energy flow from said generating means to said receiving circuit means while permitting energy flow from said generating means to said transducer and from said transducer to said receiving circuit means;

means for establishing relative motion between said region and said transducer,
so that the path length for energy reflected from an anomaly changes continuously at a rate different from the rate of any change occurring in the path length for said unwanted energy not reflected from an anomaly,
whereby the frequency, at said transducer, of energy which is reflected from an anomaly differs from the frequency at said transducer, of said unwanted energy not reflected from an anomaly; and frequency selective means in said receiving circuit means responsive only to energy reflected from an anomaly, thereby to indicate the existence of an anomaly.

15. The ultrasonic inspection apparatus of claim 14 wherein:

said directional impedance means comprises a hybrid bridge,
said transducer being connected in one arm of said bridge,
a network having an impedance matching the impedance of said transducer being connected in another arm of said bridge, and
said receiving circuit means being connected across a diagonal of said bridge.

16. The ultrasonic inspection apparatus of claim 14 wherein:

the frequency of said transmitted ultrasonic energy is substantially constant;

said relative motion between said transducer and said region is such that the path length for energy reflected from an anomaly changes at a substantially constant rate,
    whereby the frequency, at said transducer, of anomaly-reflected energy is substantially constant and different from the frequency of said transmitted energy; and
said frequency selective means comprises band pass filter means adapted to pass only said substantially constant frequency of said anomaly-reflected energy.

17. The ultrasonic inspection apparatus of claim 14 wherein:
said relative motion between said transducer and said region is such that
    the path length for energy reflected from an anomaly changes at a substantially constant rate and the path length for said unwanted energy not reflected from an anomaly remains substantially constant,
    whereby the difference, at said transducer, between the frequency of said energy which is reflected from an anomaly and the frequency of said transmitted energy is substantially constant, and whereby the frequency, at said transducer, of said unwanted energy which is not reflected from an anomaly is substantially the same as the frequency of said transmitted energy;
and wherein further said frequency selective means comprises:
phase comparison means in said receiving circuit means;
means to couple a sample of energy from said generating means to said phase comparison means;
said phase comparison means being adapted to compare the phases of energy from said transducer received in said receiving circuitry means and energy coupled from said generating means and provide an output signal representative of their phase difference,
    whereby that portion of said received energy which is reflected from an anomaly produces an alternating output signal of substantially constant frequency, and that portion of said received energy comprising said unwanted energy not reflected from an anomaly produces a substantially constant output signal; and
means connected to said phase comparison means responsive to said alternating output signal of substantially constant frequency and not responsive to said substantially constant output signal.

18. The ultrasonic inspection apparatus of claim 17 wherein:
said means connected to said phase comparison means comprises band pass filter means having a pass band centered at the substantially constant frequency of the output signal produced by said anomaly-reflected energy.

19. The ultrasonic inspection apparatus of claim 14 wherein:
said region is bounded by at least one cylindrical interface;
said relative motion between said region and said transducer is such that the path length for energy reflected from said interface remains substantially constant,
    whereby the frequency, at said transducer, of interface-reflected energy is substantially the same as the frequency of said transmitted energy; and
wherein said frequency selective means includes means for discriminating between the frequency of said anomaly-reflected energy and the frequency of said transmitted energy.

20. The ultrasonic apparatus in accordance with claim 19 wherein:
the frequency of said transmitted energy is substantially constant;
said relative motion between said transducer and said region is such that said cylindrical interface is rotated about its axis with a substantially constant angular velocity,
    whereby the rate of change of the path length of anomaly-reflected energy is substantially constant, and whereby the frequency, at said transducer, of said anomaly-reflected energy is substantially constant; and
said frequency selective means comprises band pass filter means having a pass band centered at said substantially constant frequency of said anomaly-reflected energy.

21. The ultrasonic inspection apparatus of claim 14 wherein:
said region is bounded by at least one cylindrical interface;
said relative motion between said region and said transducer is such that the path length for energy reflected from said interface remains substantially constant,
    whereby the frequency, at said transducer, of interface-reflected energy is substantially the same as the frequency of said transmitted energy; and
wherein said frequency selective means comprises:
phase comparison means in said receiving circuit means;
means to couple a sample of energy from said generating means to said phase comparison means;
said phase comparison means being adapted to compare the phases of energy from said transducer received in said receiving circuitry means and energy coupled from said generating means and provide an output signal representative of their phase difference,
    whereby energy which is reflected from an anomaly produces an alternating output signal, and energy which is reflected from said cylindrical interface produces a substantially constant output signal; and
means connected to said phase comparison means responsive to said alternating output signal produced by said anomaly-reflected energy and not responsive to said substantially constant output signal produced by said interface-reflected energy.

References Cited

UNITED STATES PATENTS 2,776,425   1/1957   Altman _____ 343—7.7

FOREIGN PATENTS 683,592   12/1952   Great Britain.

OTHER REFERENCES

Skolnik, M. I.: Introduction to Radar Systems, N.Y., McGraw-Hill, 1962, pp. 72 to 78 and 106. TK 6575 S5.

RICHARD C. QUEISSER, *Primary Examiner.*

JOHN P. BEAUCHAMP, *Assistant Examiner.*